US011775344B1

(12) United States Patent
Wang

(10) Patent No.: US 11,775,344 B1
(45) Date of Patent: Oct. 3, 2023

(54) TRAINING TASK QUEUING CAUSE ANALYSIS METHOD AND SYSTEM, DEVICE AND MEDIUM

(71) Applicant: INSPUR SUZHOU INTELLIGENT TECHNOLOGY CO., LTD., Jiangsu (CN)

(72) Inventor: Wenxiao Wang, Shandong (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/036,864

(22) PCT Filed: Sep. 29, 2021

(86) PCT No.: PCT/CN2021/121870
§ 371 (c)(1),
(2) Date: May 12, 2023

(87) PCT Pub. No.: WO2022/116667
PCT Pub. Date: Jun. 9, 2022

(30) Foreign Application Priority Data

Dec. 4, 2020 (CN) .......................... 202011402706.2

(51) Int. Cl.
G06F 9/48 (2006.01)
G06F 9/38 (2018.01)
(52) U.S. Cl.
CPC .......... *G06F 9/4881* (2013.01); *G06F 9/3891* (2013.01)
(58) Field of Classification Search
None
See application file for complete search history.

(56) References Cited

U.S. PATENT DOCUMENTS 5,329,596 A * 7/1994 Sakou ................ G06V 30/2504
382/226
5,361,323 A * 11/1994 Murata ............... G10L 19/0018
704/E19.017
(Continued)

FOREIGN PATENT DOCUMENTS

CN           1913663 A     2/2007
CN         108153587 A     6/2018
(Continued)

OTHER PUBLICATIONS

Jie Song. "Research on energy consumption optimization method of big data processing platform." pp. 122-124. Nov. 30, 2016.

*Primary Examiner* — Van H Nguyen
(74) *Attorney, Agent, or Firm* — IPRO, PLLC

(57) ABSTRACT

The present application discloses a system, readable storage medium, and method for analyzing a cause of training-task queuing, wherein the method includes the steps of: obtaining a required resource that is required by a training task inputted by a user and a remaining resource of a cluster; in responding to that the remaining resource does not satisfy the required resource, obtaining a plurality of cluster center data that are pre-generated in a cluster model; regarding the required resource and the remaining resource as sample data, and calculating distances between the sample data and each of the cluster center data; and feeding back a cause corresponding to the cluster center datum that has a minimum distance with the sample data.

7 Claims, 2 Drawing Sheets

(56) References Cited

U.S. PATENT DOCUMENTS

| | | | | |
|---|---|---|---|---|
| 9,152,860 B2* | 10/2015 | Cervin | ................ | G06V 30/192 |
| 9,720,998 B2* | 8/2017 | Wang | .................... | G06F 16/285 |
| 10,241,832 B2* | 3/2019 | Naganathan | .......... | G06F 9/4887 |
| 10,990,900 B2* | 4/2021 | Lindner | .................. | G06F 9/547 |
| 11,234,629 B2* | 2/2022 | Liu | ........................ | A61B 5/349 |
| 11,347,546 B2* | 5/2022 | Wang | .................... | G06F 9/4881 |
| 11,366,806 B2* | 6/2022 | Urbanke | ............... | G06F 16/244 |
| 11,507,419 B2* | 11/2022 | Li | .......................... | G06F 9/4881 |
| 2019/0179677 A1 | 6/2019 | Delaney et al. | | |

FOREIGN PATENT DOCUMENTS

| | | |
|---|---|---|
| CN | 109634748 A | 4/2019 |
| CN | 109828833 A | 5/2019 |
| CN | 110609742 A | 12/2019 |
| CN | 11191794 A | 5/2020 |
| CN | 111198767 A | 5/2020 |
| CN | 112463334 A | 3/2021 |

* cited by examiner

TRAINING TASK QUEUING CAUSE ANALYSIS METHOD AND SYSTEM, DEVICE AND MEDIUM

CROSS-REFERENCE TO RELATED APPLICATION

The present application claims the priority of the Chinese patent application filed on Dec. 4, 2020 before the Chinese Patent Office with the application number of 202011402706.2 and the title of "METHOD AND SYSTEM FOR ANALYZING CAUSE OF TRAINING-TASK QUEUING, DEVICE AND MEDIUM", which is incorporated herein in its entirety by reference.

TECHNICAL FIELD

The present application relates to the technical field of deep learning and, more particularly, to a method and system for analyzing a cause of training-task queuing, a device and a storage medium.

BACKGROUND

Currently, as artificial intelligence is gradually extensively used in various industries, industry experts are tending to solve complicated problems from the perspective of artificial intelligence, various algorithm frames are applied in various fields, and at the same time algorithmic models are continuously improved by algorithm engineers. All of those trends require supporting by a strong calculation power. Therefore, the calculation power becomes more and more important. In the original production mode, algorithm engineers more tend to use a single server or several public servers for the algorithm training. However, with the continuous expansion of the staff size, the problem of resource allocation and scrambling is becoming increasingly more serious, which highly affects the working efficiency of the algorithm engineers. Therefore, for the large-scale algorithm engineers, it is very necessary to establish a calculation-power resource pool for resource management. On the platform applying the algorithms, the engineers only need to apply for the resource, and the remaining matters are left to the platform resource dispatcher to solve, which greatly increases the production efficiency.

Usually, the platform dispatcher may perform the dispatching operation only when the resource applied for by the task satisfies the requirements of the calculation-power resource pool. If the condition is not satisfied, then the platform dispatcher places the task into a waiting queue, and performs the dispatching again when the resource satisfies the requirements, which process is circulated and repeated. However, in a user rush hour, the central processing unit (CPU) resource and the graphics processing unit (GPU) resource in the resource pool are exhausted very quickly, and the subsequent tasks can not be performed, but only wait for the dispatching.

SUMMARY

In view of the above, in order to overcome at least one aspect of the above-described problem, an embodiment of the present application provides a method for analyzing a cause of training-task queuing, wherein the method includes the steps of:

obtaining a required resource that is required by a training task inputted by a user and a remaining resource of a cluster;

in responding to that the remaining resource does not satisfy the required resource, obtaining a plurality of cluster center data that are pre-generated in a cluster model;

regarding the required resource and the remaining resource as sample data, and calculating distances between the sample data and each of the cluster center data; and feeding back a cause corresponding to the cluster center datum that has a minimum distance with the sample data.

In some embodiments, the step of regarding the required resource and the remaining resource as the sample data includes:

performing quantization processing to the sample data.

In some embodiments, the method further includes:

saving the sample data; and in responding to that a quantity of the saved sample data reaches a threshold, by using the saved sample data, updating the cluster model.

In some embodiments, the step of, by using the saved sample data, updating the cluster model includes:

randomly generating the plurality of cluster center data;

calculating distances between the saved sample data and each of the current cluster center data and distances between original sample data in the cluster model and each of the current cluster center data, to divide the saved sample data and the original sample data in the cluster model into the corresponding cluster center data;

by using the sample data in each of the cluster center data, recalculating the corresponding cluster center data; and in responding to that the cluster center data obtained by the calculation are different from the cluster center data that are currently used for the sample-data division, performing division of the sample data again by using the cluster center data obtained by the calculation, to perform iterative training, till the cluster center data obtained by the calculation and the cluster center data that are currently used for the sample-data division are the same.

On the basis of the same inventive concept, according to another aspect of the present application, an embodiment of the present application further provides a system for analyzing a cause of training-task queuing, wherein the system includes:

an obtaining module, wherein the obtaining module is configured for obtaining a required resource that is required by a training task inputted by a user and a remaining resource of a cluster;

a determining module, wherein the determining module is configured for, in responding to the remaining resource does not satisfy the required resource, obtaining a plurality of cluster center data that are pre-generated in a cluster model;

a calculating module, wherein the calculating module is configured for, regarding the required resource and the remaining resource as sample data, and calculating distances between the sample data and each of the cluster center data; and a feeding-back module, wherein the feeding-back module is configured for, feeding back a cause corresponding to the cluster center datum that has a minimum distance with the sample data.

In some embodiments, the calculating module is further configured for:

performing quantization processing to the sample data.

In some embodiments, the system further includes an updating module, and the updating module is configured for:

saving the sample data; and in responding to that a quantity of the saved sample data reaches a threshold, by using the saved sample data, updating the cluster model.

In some embodiments, the updating module is further configured for:

randomly generating the plurality of cluster center data;

calculating distances between the saved sample data and each of the current cluster center data and distances between original sample data in the cluster model and each of the current cluster center data, to divide the saved sample data and the original sample data in the cluster model into the corresponding cluster center data;

by using the sample data in each of the cluster center data, recalculating the corresponding cluster center data; and in responding to that the cluster center data obtained by the calculation are different from the cluster center data that are currently used for the sample-data division, performing division of the sample data again by using the cluster center data obtained by the calculation, to perform iterative training, till the cluster center data obtained by the calculation and the cluster center data that are currently used for the sample-data division are the same.

On the basis of the same inventive concept, according to another aspect of the present application, an embodiment of the present application further provides a computer device, wherein the computer device includes:

at least one processor; and a memory, the memory storing a computer program that is executable in the processor, wherein the processor, when executing the program, implements the steps of the method for analyzing a cause of training-task queuing according to any one of the above embodiments.

On the basis of the same inventive concept, according to another aspect of the present application, an embodiment of the present application further provides a computer-readable storage medium, the computer-readable storage medium storing a computer program, wherein the computer program, when executed by a processor, implements the steps of the method for analyzing a cause of training-task queuing according to any one of the above embodiments.

The present application has one of the following advantageous technical effects. By using the solutions according to the present application, the capacity of the platform of distinguishing the causes of queuing tasks is increased, the user may be enabled to rapidly acquire the cause of the task queuing, the usability of the platform is improved, the user experience is improved, and correspondingly the research and development of the related deep-learning platforms are instructed.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art may obtain other embodiments according to these figures without paying creative work.

DETAILED DESCRIPTION

In order to make the objects, the technical solutions and the advantages of the present application clearer, the embodiments of the present application will be further described in detail with reference to the embodiments and the drawings.

It should be noted that all of the expressions using "first" and "second" in the embodiments of the present application are intended to distinguish two different entities or different parameters that have the same names. It may be seen that "first" and "second" are merely for the convenience of the expression, and should not be construed as a limitation on the embodiments of the present application, which will not be explained in detail in the subsequent embodiments.

Figure 1:
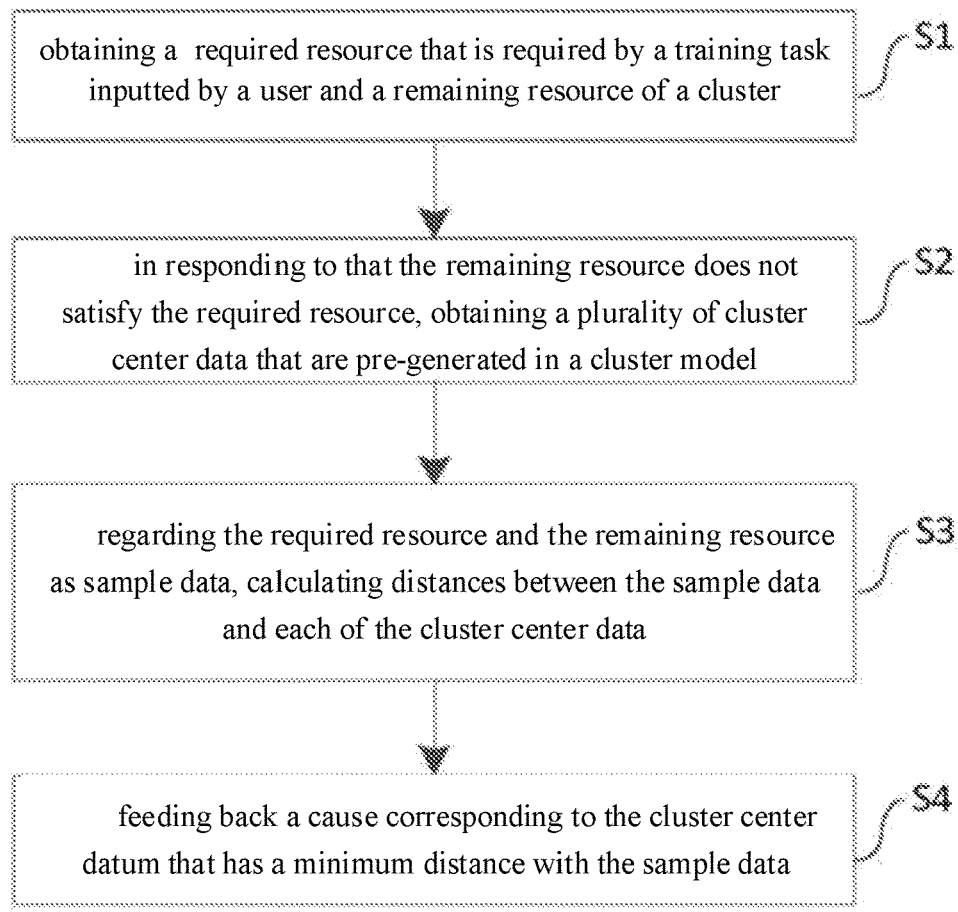
FIG. 1 is a schematic flow chart of a method for analyzing a cause of training-task queuing according to an embodiment of the present application.

According to an aspect of the present application, an embodiment of the present application discloses a method for analyzing a cause of training-task queuing. As shown in FIG. 1, the method may include the following steps:

S1: obtaining a required resource that is required by a training task inputted by a user and a remaining resource of a cluster; wherein the cluster herein refers to a computing device group, such as a computer group, a server group and so on.

S2: in responding to that the remaining resource does not satisfy the required resource, obtaining a plurality of cluster center data that are pre-generated in a cluster model;

S3: regarding the required resource and the remaining resource as sample data, and calculating distances between the sample data and each of the cluster center data; and S4: feeding back a cause corresponding to the cluster center datum that has a minimum distance with the sample data.

By using the solutions according to the present application, the capacity of the platform of distinguishing the causes of queuing tasks is increased, the user may be enabled to rapidly acquire the cause of the task queuing, the usability of the platform is improved, the user experience is improved, and correspondingly the research and development of the related deep-learning platforms are instructed.

In some embodiments, in the step S2 of, in responding to that the remaining resource does not satisfy the required resource, obtaining the plurality of cluster center data that are pre-generated in the cluster model, particularly, a real-time monitoring thread may be started up, to perform monitoring the task queuing. When the calculation-power resource pool does not satisfy the required resource that is required by the training task that the user apples for this time, it is required to determine the particular cause. In other words, the task information submitted to the platform is quantized, including the quantity of the used CPUs, the quantity of the used GPUs, the GPU types, the specified scheduling nodes and so on. The Euclidean distances between the data and the cluster center data are calculated, to find the center point closest to the data, and the corresponding queuing cause is matched.

It should be noted that the queuing causes represented by each of the cluster center data are associated in advance, and each of the cluster center data is obtained by calculation by using a plurality of sample data, for example, by calculating the average value or calculating the mean squared error.

In some embodiments, the step of regarding the required resource and the remaining resource as the sample data includes:

performing quantization processing to the sample data.

The user, according to his own demand, inputs the relevant configuration parameters of his own task, including the quantity of the used CPUs, the quantity of the used GPUs, the resource groups, the GPU types, the specified scheduling nodes and so on. Some of the parameters cannot be expressed by numerical values, for example, the GPU types, and therefore it is required to perform quantization processing to those parameters. For example, the GPU types cannot be expressed by numerical values, and it is required to perform quantization processing to them. The GPUs of different types may be distinguished by using labels or serial numbers.

In some embodiments, the method further includes:
saving the sample data; and
in responding to that a quantity of the saved sample data reaches a threshold, by using the saved sample data, updating the cluster model.

In order to enrich the cluster sample information, after each time of the determination, the sample data of this time are automatically added into a sample database, and after the quantity of the newly added sample data reaches a threshold, according to all of the sample data in the sample database at this point, the cluster center data are calculated again.

In some embodiments, the step of, by using the saved sample data, updating the cluster model includes:
randomly generating the plurality of cluster center data;
calculating distances between the saved sample data and each of the current cluster center data and distances between original sample data in the cluster model and each of the current cluster center data, to divide the saved sample data and the original sample data in the cluster model into the corresponding cluster center data;
by using the sample data in each of the cluster center data, recalculating the corresponding cluster center data; and
in responding to that the cluster center data obtained by the calculation are different from the cluster center data that are currently used for the sample-data division, performing division of the sample data again by using the cluster center data obtained by the calculation, to perform iterative training, till the cluster center data obtained by the calculation and the cluster center data that are currently used for the sample-data division are the same.

According to the service demand, the quantity of the queuing causes is set; and then the cluster center data with the quantity equal to the quantity of the queuing causes are randomly generated, the distances between each of the sample data and each of the cluster center data are individually calculated. According to the distances, g the sample data are allocated to the categories of the center points that are closest to themself, and, subsequently, according to the sample data divided into each of the cluster center data, the cluster center data are calculated again, for example, the cluster center data are calculated according to the average value. And then it is determined whether the recalculated cluster center data and the cluster center data that are currently used for the sample-data division determining are the same. When the recalculated cluster center data and the cluster center data that are currently used for the sample-data division are not the same, then continuing the iterative training, till the cluster center data no longer change. For example, the randomly generated cluster center data are A and B, and the serial numbers of the sample data divided into A and B are 1, 2, 3, 4, 5 and 6. Subsequently, the cluster center datum A' is calculated by using the sample data of the serial numbers of 1, 2 and 3, and the cluster center datum B' is calculated by using the sample data of the serial numbers of 4, 5 and 6. Subsequently, it is determined whether A' and B' are the same as A and B. When A' and B' are different from A and B, then all of the sample data are divided by using A' and B', and the new cluster center data are calculated again. Accordingly, after multiple times of the iteration, the cluster center data no longer change, and the finally obtained cluster center data are mapped to the causes of task queuing.

The solutions according to the present application, by using the clustering algorithm, use the task resource usage amount (the CPU and GPU usage amounts) and the state of the current load of the platform server cluster (the CPU load and the GPU load) as the basic information of the queuing category factor, search for the cluster centers in the limited times of iteration, and map the cluster centers to the corresponding queuing causes. When the user submits the task, if the task is not dispatched because the resource is not matched, the current basic factors are compared with the cluster centers, to find the center points closest to the basic factors of itself, the cause of the task queuing submitted this time is attributed to that type, and the queuing cause is issued by using a monitoring mechanism, to enable the user to timely acquire the queuing cause and make the corresponding resource changing.

Figure 2:
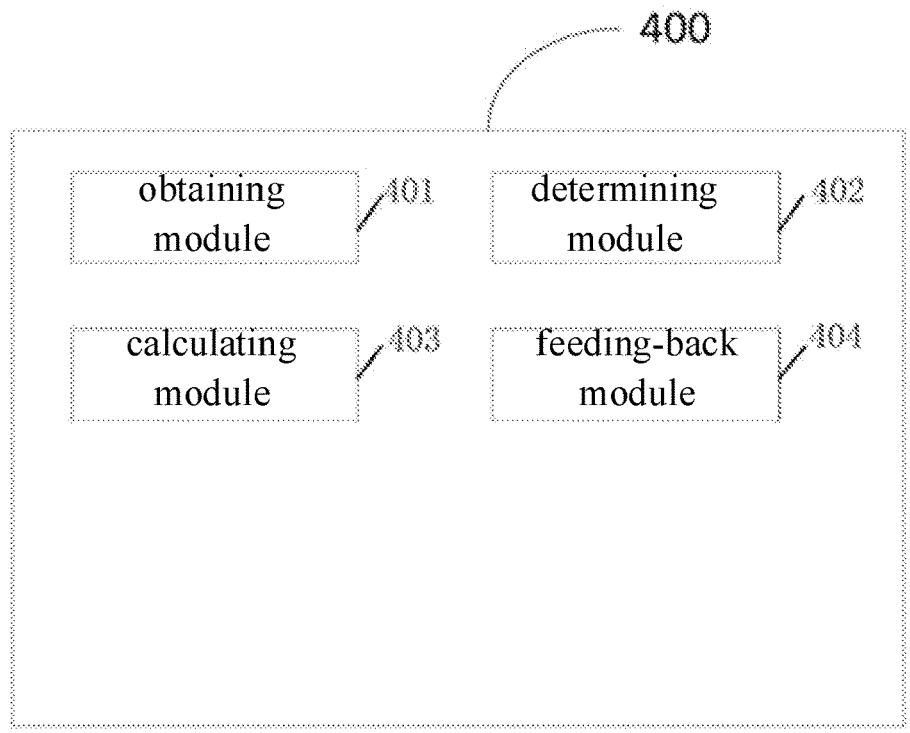
FIG. 2 is a schematic diagram showing the structure of a system for analyzing a cause of training-task queuing according to an embodiment of the present application.

On the basis of the same inventive concept, according to another aspect of the present application, an embodiment of the present application further provides a system for analyzing a cause of training-task queuing 400. As shown in FIG. 2, the system includes:

an obtaining module 401, wherein the obtaining module 401 is configured for obtaining a required resource that is required by a training task inputted by a user and a remaining resource of a cluster;

a determining module 402, wherein the determining module 402 is configured for, in responding to that the remaining resource does not satisfy the required resource, obtaining a plurality of cluster center data that are pre-generated in a cluster model;

a calculating module 403, wherein the calculating module 403 is configured for, regarding the required resource and the remaining resource as sample data, and calculating distances between the sample data and each of the cluster center data; and a feeding-back module 404, wherein the feeding-back module 404 is configured for, feeding back a cause corresponding to the cluster center datum that has a minimum distance with the sample data.

In some embodiments, the calculating module is further configured for:

performing quantization processing to the sample data.

In some embodiments, the system further includes an updating module, and the updating module is configured for:
  saving the sample data; and
  in responding to that a quantity of the saved sample data reaches a threshold, by using the saved sample data, updating the cluster model.

In some embodiments, the updating module is further configured for:
  randomly generating the plurality of cluster center data;
  calculating distances between the saved sample data and each of the current cluster center data and distances between original sample data in the cluster model and each of the current cluster center data, to divide the saved sample data and the original sample data in the cluster model into the corresponding cluster center data;
  by using the sample data in each of the cluster center data, recalculating the corresponding cluster center data; and
  in responding to that the cluster center data obtained by the calculation are different from the cluster center data that are currently used for the sample-data division, performing division of the sample data again by using the cluster center data obtained by the calculation, to perform iterative training, till the cluster center data obtained by the calculation and the cluster center data that are currently used for the sample-data division are the same.

Figure 3:
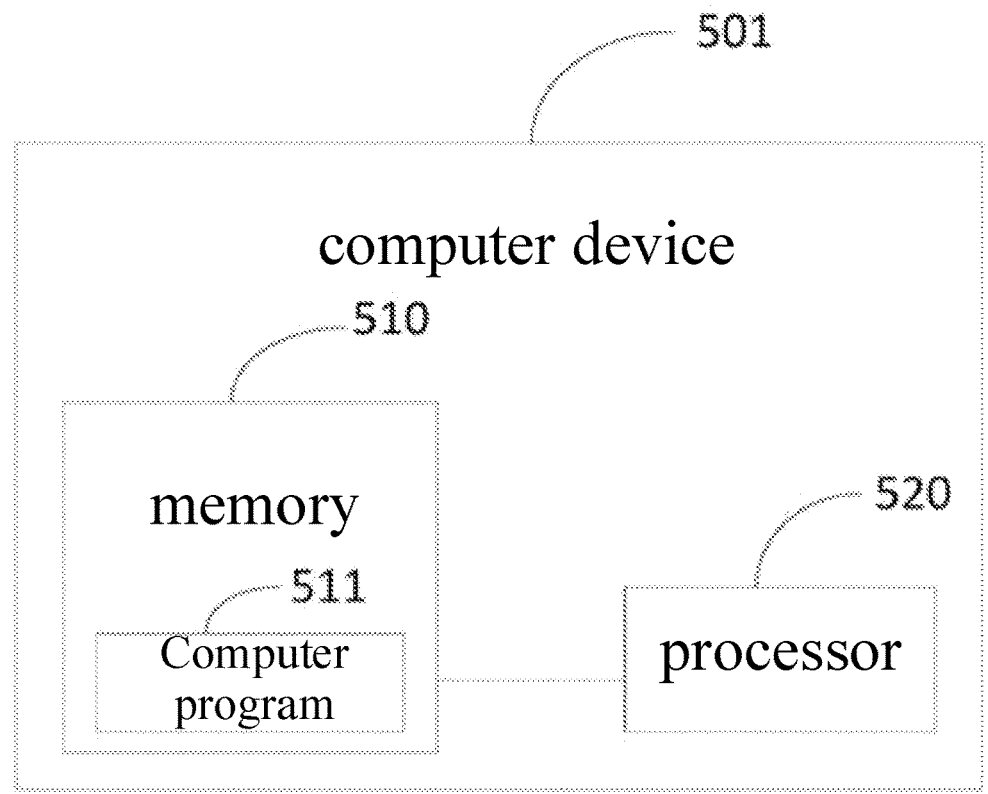
FIG. 3 is a schematic diagram showing the structure of a computer device according to an embodiment of the present application.

On the basis of the same inventive concept, according to another aspect of the present application, as shown in FIG. 3, an embodiment of the present application further provides a computer device 501, wherein the computer device 501 includes:
  at least one processor 520; and
  a memory 510, the memory 510 storing a computer program 511 that is executable in the processor, wherein the processor 520, when executing the computer program, implements the steps of the method for analyzing a cause of training-task queuing according to any one of the above embodiments.

Figure 4:
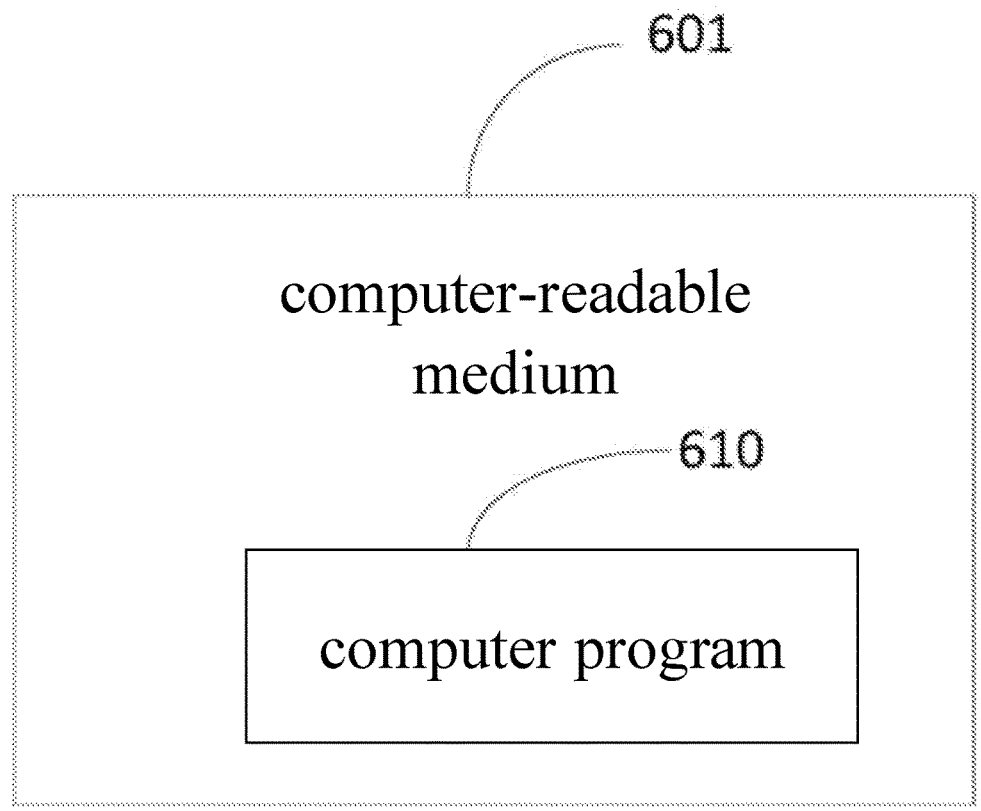
FIG. 4 is a schematic diagram showing the structure of a computer-readable storage medium according to an embodiment of the present application.

On the basis of the same inventive concept, according to another aspect of the present application, as shown in FIG. 4, an embodiment of the present application further provides a computer-readable storage medium 601, the computer-readable storage medium 601 storing a computer program instruction 610, wherein the computer program instruction 610, when executed by a processor, implements the steps of the method for analyzing a cause of training-task queuing according to any one of the above embodiments.

Finally, it should be noted that a person skilled in the art may understand that all or some of the processes of the methods according to the above embodiments may be implemented by relative hardware according to an instruction from a computer program, the program may be stored in a computer-readable storage medium, and the program, when executed, may contain the processes of the embodiments of the method stated above.

Furthermore, it should be noted that the computer-readable storage medium (for example, a memory) as used herein may be a volatile memory or a non-volatile memory, or may include both of a volatile memory and a non-volatile memory.

A person skilled in the art should also understand that various illustrative logical blocks, modules, electric circuits and algorithm steps described with reference to the disclosure herein may be embodied as electronic hardware, computer software or a combination thereof. In order to clearly explain the interchangeability between the hardware and the software, it has be described generally with reference to the functions of various illustrative components, blocks, modules, electric circuits and steps. Whether those functions are embodied as software or hardware depends on the applications and the design constraints exerted on the entire system. A person skilled in the art may employ different modes to implement the functions with respect to each of the applications, but those implementation decisions should not be considered as leading to departing from the scope disclosed by the embodiments of the present application.

The illustrative embodiments disclosed by the present application are described above. However, it should be noted that many variations and modifications may be made without departing from the scope of the embodiments of the present application defined by the claims. The functions, steps and/or acts of the process claims according to the disclosed embodiments described herein are not required to be implemented in any specific sequence. Furthermore, although the elements of the embodiments of the present application may be described or claimed in a singular form, unless explicitly limited as singular, they may also be comprehended as plural.

It should be understood that, as used herein, unless the context clearly supports an exception, the singular form "a" is intended to encompass a plural form. It should also be understood that, as used herein, the "and/or" refers to including any and all feasible combinations of one or more relatively listed items.

The serial numbers of the embodiments of the present application are merely for the purpose of description, and do not indicate the relative preferences of the embodiments.

A person skilled in the art may understand that all or some of the steps for implementing the above embodiments may be completed by hardware, and may also be completed by using a program to instruct relevant hardware. The program may be stored in a computer-readable storage medium. The above-mentioned storage medium may be a read-only memory, a magnetic disk, an optical disk and so on.

A person skilled in the art should understand that the discussion on any of the above embodiments is merely illustrative, and are not intended to imply that the scope (including the claims) of the embodiments of the present application is limited to those examples. With the concept of the embodiments of the present application, the embodiments or the technical features of different embodiments may be combined, and many other variations of different aspects of the embodiments of the present application as stated above may exist, which are not provided in detail for brevity. Therefore, any omissions, modifications, equivalent substitutions and improvements that are made within the spirit and the principle of the embodiments of the present application should fall within the protection scope of the embodiments of the present application.

The invention claimed is:

1. A method for analyzing a cause of training-task queuing, comprising:
  obtaining a required resource that is required by a training task inputted by a user and a remaining resource of a cluster;
  in responding to that the remaining resource does not satisfy the required resource, obtaining a plurality of cluster center data that are pre-generated in a cluster model;
  regarding the required resource and the remaining resource as sample data, and
  calculating distances between the sample data and each of the cluster center data;

feeding back a cause corresponding to the cluster center datum that has a minimum distance with the sample data;

saving the sample data;

in responding to that a quantity of the saved sample data reaches a threshold, by using the saved sample data, updating the cluster model, wherein the step of, by using the saved sample data, updating the cluster model comprises:

randomly generating the plurality of cluster center data;

calculating distances between the saved sample data and each of the current cluster center data and distances between original sample data in the cluster model and each of the current cluster center data, to divide the saved sample data and the original sample data in the cluster model into the corresponding cluster center data;

by using the sample data in each of the cluster center data, recalculating the corresponding cluster center data; and in responding to that the cluster center data obtained by the calculation are different from the cluster center data that are currently used for the sample-data division, performing division of the sample data again by using the cluster center data obtained by the calculation to perform iterative training, till the cluster center data obtained by the calculation and the cluster center data that are currently used for the sample-data division are the same.

2. The method according to claim 1, wherein the step of regarding the required resource and the remaining resource as the sample data comprises:

performing quantization processing to the sample data.

3. A computer device, comprising: at least one processor; and a memory, the memory storing a computer program that is executable in the processor, wherein the processor, when executing the computer program, implements the steps of the method according to claim 1.

4. A non-transitory computer-readable storage medium, the computer-readable storage medium storing a computer program, wherein the computer program, when executed by a processor, implements the steps of the method according claim 1.

5. The method according to claim 1, wherein in responding to that the remaining resource does not satisfy the required resource, obtaining the plurality of cluster center data that are pre-generated in the cluster model comprises:

starting up a real-time monitoring thread to monitor the training-task queuing.

6. The method according to claim 1, wherein calculating distances between the sample data and each of the cluster center data comprises:

calculating Euclidean distances between the sample data and each of the cluster center data.

7. The method according to claim 1, wherein the sample data comprises configuration parameters related to the training task, and the configuration parameters comprises: a quantity of used CPUs, a quantity of used GPUs, resource groups, GPU types and specified scheduling nodes.

* * * * *